United States Patent
Dietrich et al.

(10) Patent No.: US 11,215,773 B1
(45) Date of Patent: Jan. 4, 2022

(54) PLUGGABLE LASER MODULE WITH IMPROVED SAFETY

(71) Applicant: MELLANOX TECHNOLOGIES DENMARK APS, Roskilde (DK)

(72) Inventors: Casper Dietrich, Roskilde (DK); Henning Lysdal, Roskilde (DK)

(73) Assignee: MELLANOX TECHNOLOGIES DENMARK APS, Roskilde (DK)

( * ) Notice: Subject to any disclaimer, the term of this patent is extended or adjusted under 35 U.S.C. 154(b) by 0 days.

(21) Appl. No.: 16/900,926

(22) Filed: Jun. 14, 2020

(51) Int. Cl.
*G02B 6/42* (2006.01)

(52) U.S. Cl.
CPC ......... *G02B 6/4278* (2013.01); *G02B 6/4204* (2013.01)

(58) Field of Classification Search
CPC ............................. G02B 6/4204; G02B 6/4278
See application file for complete search history.

(56) References Cited

U.S. PATENT DOCUMENTS

| | | | |
|---|---|---|---|
| 6,986,679 B1 | 1/2006 | Aronson et al. | |
| 2003/0133666 A1 | 7/2003 | Chiu et al. | |
| 2007/0237464 A1 | 10/2007 | Aronson et al. | |
| 2012/0177071 A1* | 7/2012 | Jacob | H03K 4/026 372/25 |
| 2014/0010552 A1 | 1/2014 | McColloch et al. | |
| 2016/0018608 A1 | 1/2016 | Chan et al. | |
| 2019/0129112 A1* | 5/2019 | Matiss | H04B 10/503 |
| 2020/0382220 A1* | 12/2020 | Leigh | G02B 6/262 |

FOREIGN PATENT DOCUMENTS

CN 102830472 A 12/2012

OTHER PUBLICATIONS

Mellanox Technologies, "Cloud without compromise", pp. 1-7, year 2020 downloaded from https://www.mellanox.com/products/ethernet-switches.
Nvidia Networking, "LinkX® Ethernet Optical Transceivers", pp. 1-3, year 2020 downloaded from https://www.mellanox.com/products/interconnect/ethernet-optical-transceivers.
Cpo JDF, "Co-packaged Optics External Laser Source Guidance Document", V1.0, pp. 1-23, Jan. 18, 2020.

* cited by examiner

Primary Examiner — Sung H Pak
Assistant Examiner — Hoang Q Tran
(74) Attorney, Agent, or Firm — Kligler & Associates Patent Attorneys Ltd

(57) ABSTRACT

A laser module includes one or more connectors and a laser source. The one or more connectors are configured to receive electrical power from, and to output a light beam to, a panel of a system. The laser source is configured to (i) be powered by the electrical power, and (ii) produce the light beam using the electrical power. The one or more connectors and the laser source are detachable from the panel, and when detached from the panel, the laser source is not powered by the electrical power.

8 Claims, 2 Drawing Sheets

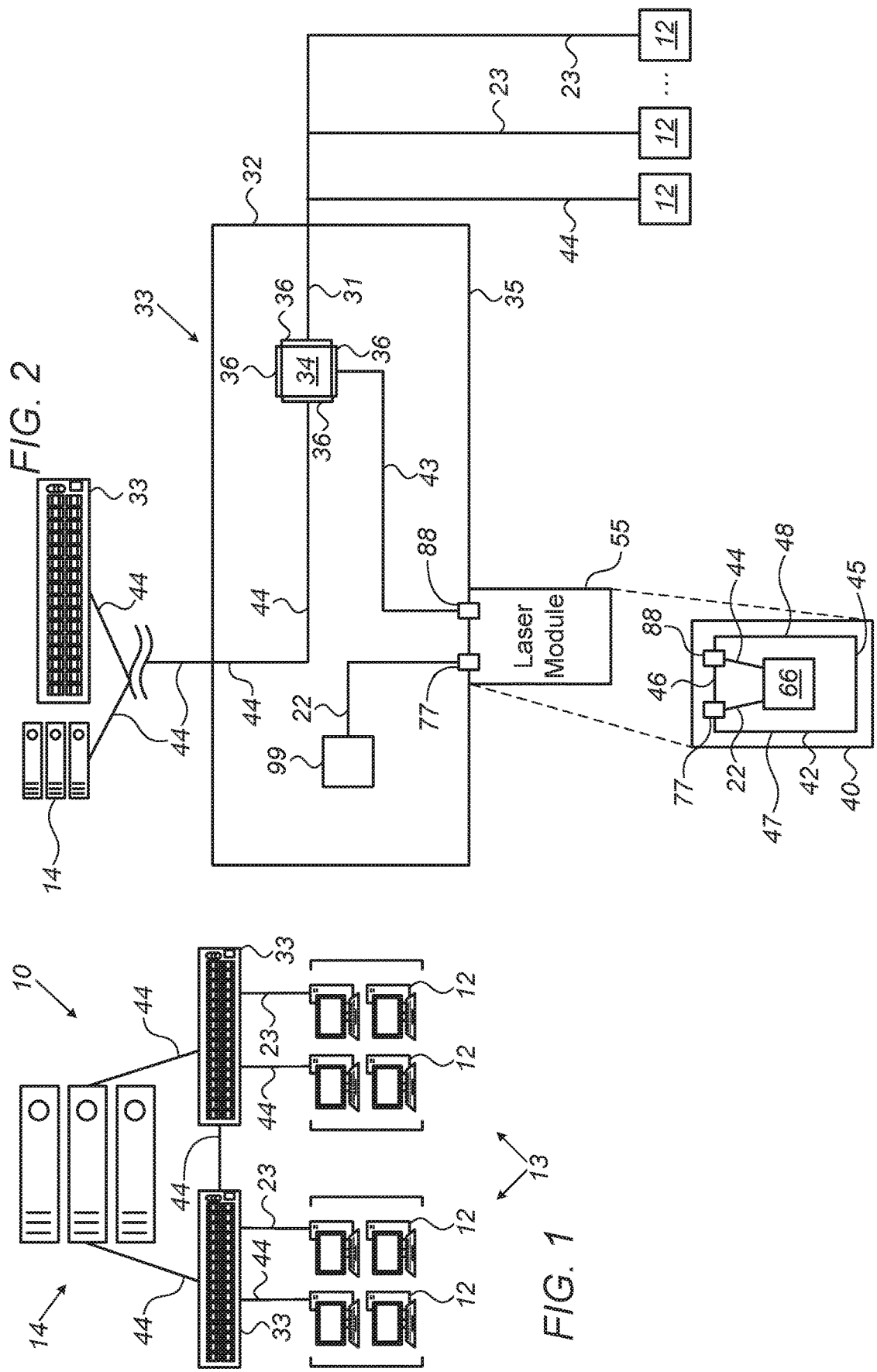

PLUGGABLE LASER MODULE WITH IMPROVED SAFETY

FIELD OF THE INVENTION

The present invention relates generally to optoelectronic systems, and particularly to methods and systems for improving safety and serviceability of optoelectronic systems.

BACKGROUND OF THE INVENTION

Optical communication systems may comprise various designs of electro-optical modules.

For example, U.S. Patent Application Publication 2014/0010552 describes a Z-pluggable optical communications module (OCM) that contains multiple parallel OCMs (POCMs) and that is configured to be removably plugged into an opening formed in a panel of an optical communications system.

U.S. Patent Application Publication 2016/0018608 describes an optical communications module including a receptacle with a stop member. The receptacle has a keyway and a latchway. The keyway is configured to receive and guide a body of the connector plug in a direction along a keyway axis. The latchway is defined by a total flexure range of the flexible latch arm between a fully flexed state and a fully relaxed state.

SUMMARY OF THE INVENTION

An embodiment of the present invention that is described herein provides a laser module including one or more connectors and a laser source. The one or more connectors are configured to receive electrical power from, and to output a light beam to, a panel of a system. The laser source is configured to (i) be powered by the electrical power, and (ii) produce the light beam using the electrical power. The one or more connectors and the laser source are detachable from the panel, and when detached from the panel, the laser source is not powered by the electrical power.

In some embodiments, the one or more connectors are mounted on a same edge of a substrate. In other embodiments, the same edge, on which the one or more connectors are mounted, is a rear edge that faces the system, and the substrate has a front edge, which is opposite the rear edge and faces an operator of the system. In yet other embodiments, the one or more connectors include an electrical connector and an optical connector, which are mounted side-by-side along the same edge.

In an embodiment, the laser module includes at least one of: (i) an electrical trace connecting between the electrical connector and the laser source, and (ii) an optical guide connecting between the laser source and the optical connector. In another embodiment, the optical guide includes at least one of (i) an optical fiber and (ii) an optical waveguide. In yet another embodiment, the system includes a network switch, and the one or more connectors are configured to be plugged into the panel and to output the laser beam to the panel of the network switch.

In some embodiments, the one or more connectors are mounted on different edges of a substrate. In other embodiments, the one or more connectors are mounted on opposing edges of a substrate. In yet other embodiments, the one or more connectors are mounted on a substrate, and are configured to be positioned within a chassis of the system when the substrate is plugged into the panel.

There is additionally provided, in accordance with an embodiment of the present invention, a method for producing a laser module, the method includes mounting, on a substrate, one or more connectors for receiving electrical power from, and outputting a light beam to, a panel of a system. A laser source (i) being powered by the electrical power, and (ii) produces the light beam using the electrical power, is mounted on the substrate. The one or more connectors and the laser are detachable from the panel, and when detached from the panel, the laser source is not powered.

There is additionally provided, in accordance with an embodiment of the present invention, a system including a laser module and one or more optical transceivers. The laser module includes one or more connectors and a laser source. The one or more connectors are configured to receive electrical power from, and to output a light beam to, a panel of a system. The laser source is configured to (i) be powered by the electrical power, and (ii) produce the light beam using the electrical power. The one or more connectors and the laser source are detachable from the panel, and when detached from the panel, the laser source is not powered by the electrical power. The one or more optical transceivers are configured to modulate the light beam received from the laser module, by applying an electrical signal onto the light beam.

The present invention will be more fully understood from the following detailed description of the embodiments thereof, taken together with the drawings in which:

BRIEF DESCRIPTION OF THE DRAWINGS

FIG. 1 is a schematic, pictorial illustration of a data center comprising an optical communication system (OCS), in accordance with an embodiment of the present invention;

FIG. 2 is a schematic, pictorial illustration of a network switch, in accordance with an embodiment of the present invention.

DETAILED DESCRIPTION OF EMBODIMENTS

Overview

Figure 3:
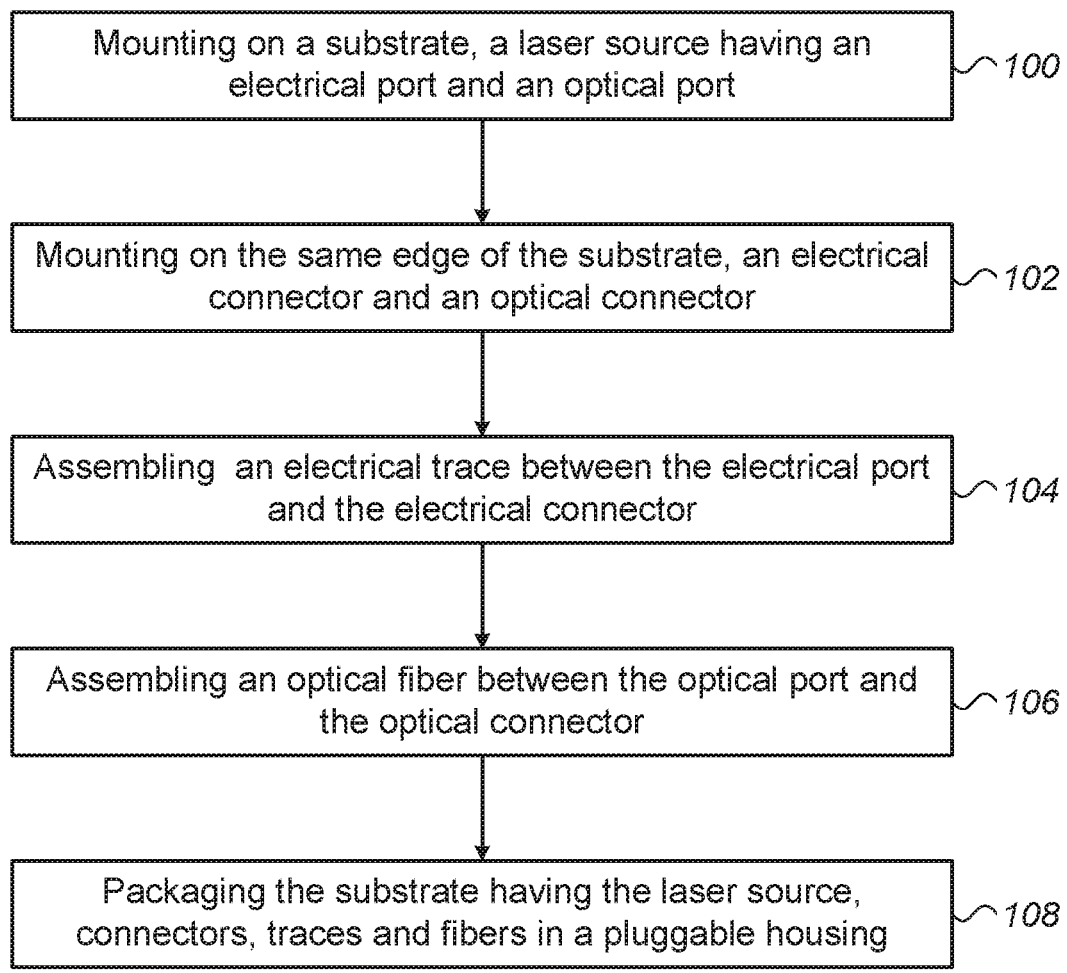
FIG. 3 is a flow chart that schematically illustrates a method for producing a laser module that is pluggable into a panel of a network switch, in accordance with an embodiment of the present invention.

In optoelectronic systems, such as optical communication systems (OCSs), communication may be carried out by exchanging electrical signals and optical signals among elements of the OCS, such as but not limited to servers, switches and routers.

Embodiments of the present invention that are described hereinbelow provide techniques for improving the safety and serviceability of network switches and other types of elements of optoelectronic systems. In principle, it is possible to plug a laser source into a panel of the switch having an optical path that may include optical fibers extended out of the switch, but when breaking the optical path, e.g., by unintentional unplugging or breaking of an optical fiber when servicing an adjacent component of the switch, a service engineer may be exposed to hazardous light emitted from the laser source.

In some embodiments, a switch of the OCS comprises an integrated circuit (IC), which is configured to exchange electrical and optical communication signals with the aforementioned elements of the OCS. The switch comprises a pluggable laser module (LM), which is configured to be plugged and unplugged from a panel of the switch, and to emit a light beam in response to receiving power from a power source. In some embodiments, the LM has one or more connectors, which are mounted on the same edge of the LM, and are configured to receive electrical power from the power source, and to output the light beam to the panel of the system, the LM is described in more detail below. Note that in this configuration, when detached from the panel, the LM is detached from the power source, and therefore, cannot emit the light beam that may be hazardous to people in the switch environment.

In some embodiments, the switch comprises electrical and optical interconnects, configured for exchanging the electrical and optical communication signals between the aforementioned elements of the switch and of the OCS.

In some embodiments, the switch comprises one or more optical transceivers (OTRs), typically co-packaged with the IC. Each OTR is configured to: (a) receive the light beam emitted from the LM, (b) insert the light beam into an optical modulator, which is configured to produce an optical communication signal by modulating the light beam using an electrical communication signal received from the IC, and (c) output the optical communication signal, via the optical interconnect, to a destination element of the OCS.

In some embodiments, the pluggable LM comprises a substrate having a front edge (also referred to herein as a first edge), facing an operator (e.g., the service engineer) of the switch, and a rear edge (also referred to herein as a second edge), which is opposite the front edge and is configured to be plugged, by the operator, into a suitable port of the panel.

In some embodiments, the one or more connectors of the LM comprise an electrical connector and an optical connector, which are mounted side-by-side, on the rear edge of the substrate, and are configured, as described above, to receive the electrical power from the power source, and to output the light beam to the panel of the switch.

In the context of the present disclosure and in the claims, the terms "optical signal" and "optical communication signal" are used interchangeably. Similarly, the terms "electrical signal" and "electrical communication signal" are used interchangeably. The electrical and optical signals refer to communication signals exchanged between the switch and elements of the OCS.

In some embodiments, the laser module comprises a laser source, which is mounted on the substrate and is configured to be powered by the electrical power, and to produce the light beam using the electrical power. In such embodiments, when detached from the panel, the laser source is not powered, and therefore, cannot produce the light beam.

In the context of the present disclosure and in the claims, the terms "unplugged" and "detached" are used interchangeably, and are referring to a disconnection between the laser module and the panel of the switch.

The disclosed techniques improve the serviceability of network switches and other elements of optoelectronic systems, by enabling fast and easy replacement of the pluggable laser modules. Moreover, by shutting-off the light beam in an event of breaking the optical path (intentionally or accidentally), the connector scheme of the LM improves the safety of people surrounding the switch or other elements of other optoelectronic systems receiving light input.

System Description

FIG. 1 is a schematic, pictorial illustration of a data center 10 comprising an optical communication system (OCS), in accordance with an embodiment of the present invention. Data center 10 may be used, for example, for data communications and data storage, using communications protocols such as Ethernet or Infiniband.

In some embodiments, data center 10 comprises one or more electronic racks, referred to herein as racks 13. Each rack 13 comprises multiple local servers 12, which are configured to store and process the data. In some embodiments, each server 12 is connected, e.g., via one or more electrical cables 23 and/or via one or more optical fibers 44, to one or more communication switches, also referred to herein as network switches, or switches 33, using any suitable configuration. Each switch 33 is configured to exchange communication signals between one or more servers 12 located (a) within the same rack 13, (b) between racks 13 of data center 10, and (c) between racks 13 located at remote data centers (not shown).

In some embodiments, switch 33 is configured to receive an input comprising optical or electrical communication signals and to output optical communication signals. Switch 33 is further configured to receive an input comprising optical communication signals and, based on the optical communication signals, to output optical or electrical communication signals.

In some embodiments, data center 10 comprises optical fibers 44, which are configured to convey the optical communication signals between remote servers 14 and/or remote switches 33.

Communication signals are exchanged between switch 33 and other elements of data center 10 at high data rates. For example, data rate of 100 GigaBits per second (GBPS) per lane is transmitted between two similar switches 33. Transmission of communication signals at such frequencies over electrical cables for a distance longer than a few meters, typically degrades the quality of the transmitted signal.

For example, at 100 GBPS, transmission over optical fibers typically provides better signal integrity and enables higher transmission distance between two switches (e.g., from 3 meters to 100 meters) compared to transmission over electrical cables.

In the example configuration of FIG. 1, electrical cables 23 are configured to conduct the electrical communication signals over short distances (e.g., within rack 13 or between two adjacent racks 13) whereas optical fibers 44 are configured to convey the communication signals over long-distance (e.g., larger than a few meters). In other embodiments, data center 10 may have any other suitable configuration, for example, rack 13 may also have optical fibers 44 for conveying communication signals between adjacent servers 12 or racks 13.

Switch Having Pluggable Laser Modules with Improved Safety

FIG. 2 is a schematic, pictorial illustration of switch 33, in accordance with an embodiment of the present invention. In some embodiments, switch 33 has a substrate 32, made from a printed circuit board (PCB) or from any other suitable type of substrate.

In some embodiments, switch comprises one or more laser modules (LMs) 55, in the present example a single LM 55, which is configured to be plugged into, and unplugged from a panel 35 (e.g., a front panel or a rear panel) of switch 33. LM 55 is configured to receive electrical power from a power supply unit (PSU) 99, and to output a light beam using the received electrical power. LM 55 is described in further detail below.

In some embodiments, switch 33 comprises active components, such as but not limited to a switching Integrated Circuit (IC), referred to herein as an IC 34.

Typically, IC 34 comprises an application-specific IC (ASIC), which is programmed to carry out the functions described herein. In other embodiments, IC 34 may comprise any other suitable type of integrated circuit.

In some embodiments, IC 34 is configured to exchange electrical and/or optical communication signals, over respective electrical cables 23 and/or optical fibers 44, with servers 12. Substrate 32 comprises one or more interconnects 31, such as electrical traces and/or optical guides described below, for exchanging the aforementioned electrical and/or optical communication signals, respectively.

In some embodiments, IC 34 is further configured to exchange communication signals, over optical fibers 44, with remote elements, such as but not limited to remote servers 14, other switches 33, and other elements of data center 10, e.g., workstations, access points and routers (not shown).

In some embodiments, PSU 99 is coupled to substrate 32 and supplies the electrical power to LM 55, via any suitable type of electrical conductors, such as one or more electrical traces 22. In other embodiments, PSU 99 may be located at any other suitable position within switch 33 (e.g., out of substrate 32), or externally to switch 33. PSU 99 may also supply electrical power to other components of switch 33, such as IC 34.

In some embodiments, substrate 32 comprises optical guides, such as optical waveguides or, in the present example, optical fibers 43 and 44. The optical guides of switch 33 may be formed on the surface of substrate 32, and/or embedded within a structure of substrate 32 (e.g., in trenches formed in substrate 32, or between layers deposited on the surface of substrate 32).

In some embodiments, IC 34 is co-packaged with optical transceivers (OTRs) 36, which are configured to: (a) receive from optical fiber 43 the light beam emitted from LM 55, (b) insert the light beam into an optical modulator, which is configured to produce an optical communication signal by modulating the light beam using an electrical communication signal received from IC 34, and (c) output the optical communication signal via optical fibers 44.

Reference is now made to an inset 40 showing the structure of LM 55 in detail. In some embodiments, LM 55 comprises a substrate 42 made from a PCB or any other suitable type of substrate. In the present example, substrate 42 has a rectangular shape and comprises a front edge 45, which is facing an operator or a service engineer (not shown) of data center 10. Substrate 42 also comprises a rear edge 46, which is configured to be inserted into panel 35 and to be connected with a suitable hardware (e.g., connectors) of panel 35 for exchanging electrical power and unmodulated light beams as will be described in detail below.

In some embodiments, LM 55 comprises one or more connectors, in the present example, an electrical connector 77 and an optical connector 88, which are mounted on rear edge 46 of substrate 42, and are configured to exchange electrical and optical signals with panel 35 of switch 33. Electrical connector 77 is also referred to herein as an electrical input port of LM 55, and optical connector 88 is also referred to herein as an optical output port from LM 55.

In the present example, electrical connector 77 is configured to receive, via one or more electrical traces 22, the electrical power from PSU 99. Optical connector 88 is configured to output the light beam, via one or more optical fibers 43, to OTRs 36. In such embodiments, when LM 55 is inserted into panel 35, electrical connector 77 and optical connector 88 are mating with respective electrical and optical connectors of panel 35.

In other embodiments, substrate 42 may have any other suitable shape, however, electrical connector 77 and optical connector 88 are positioned side-by-side on the same edge of LM 55, typically the rear edge inserted into panel 35.

In some embodiments, LM 55 comprises a laser source 66, which is mounted on substrate 42 and is configured to be powered by the electrical power received from PSU 99, and to produce the light beam using the received electrical power.

In some embodiments, LM 55 may comprise one or more electrical traces 22, which are configured to conduct the electrical power between electrical connector 77 and laser source 66. LM 55 further comprises one or more optical guides, such as but not limited to optical fibers 44, which are configured to convey the light beams between laser source 66 and optical connector 88. Note that when LM 55 is unplugged or detached from panel 35, laser source 66 cannot produce the light beam.

Reference is now made back to the general view of FIG. 2 for describing the operation of switch 33 and LM 55, and the flow of communication signals and electrical power in data center 10. In some embodiments, a communication signal is transmitted, via electrical cable 23 and interconnect 31, into IC 34 of switch 33. Note that optical communication signals transmitted from server 12 over optical fiber 44, are converted to electrical communication signals by OTR 36, before being processed by IC 34 of switch 33.

Subsequently, OTR 36 produces the optical communication signal by modulating the light beam (received from LM 55), using the electrical communication signal received from IC 34, and transmits the optical communication signal, e.g., to remote server 14, via optical fibers 44.

In some cases, data center 10 may require repairing or replacement of a LM 55, so that a service engineer of data center 10 may detach (e.g., unplug) the respective LM 55 from panel 35 of switch 33.

In some embodiments, when LM 55 is detached from panel 35, both connectors 77 and 88 are disconnected from panel 35 so that laser source 66 is not powered, and therefore, cannot emit the light beam, which may be hazardous to an eye of the service engineer.

In some embodiments, the disclosed structure of LM 55 is adapted to secure that the power supplied to LM 55 is disconnected in the event the optical path is broken, intentionally or accidentally, by a user of any optoelectronic system comprising LM 55, and thereby preventing risk of hazardous light being injected into a human eye. Other configurations of laser modules of a network switch (or of another optoelectronic module) may have optical fibers plugged, e.g., into a front panel of the switch. Such laser modules and switches may be vulnerable to safety events, for example, while a fiber is broken when a laser module is still plugged into the front panel.

Note that by having electrical connector 77 and optical connector 88 on the same edge (e.g., rear edge 46) of LM 55, the input electrical power and the output light beam are connected to and disconnected from panel 35 at the same time (e.g., when LM 55 is respectively plugged into, and unplugged from, panel 35). Moreover, based on the disclosed techniques, all the elements of the optical path are contained within the casings of LM 55 and switch 33. Therefore, the disclosed techniques provide improved safety compared to other implementations having loops of optical fibers extending out of the switch and exposed to the surroundings.

Reference is now made back to inset 40. In other embodiments, optical connector 88 is configured to directly connect with laser source 66. In such embodiments, at least one optical guide, such as optical fiber 44, may be excluded from the configuration of LM 55. Similarly, electrical connector 77 may be configured to directly connect with laser source 66. In such embodiments, at least one electrical trace 22 may be excluded from the configuration of LM 55.

Note that the configuration of LM 55 is simplified for the sake of conceptual clarity, and the configuration of LM 55 may comprise other components in addition to or instead of the traces, guides and connectors described above.

In alternative embodiments, electrical connector 77 and optical connector 88 may be combined in a single connector (not shown), which is configured to receive the electrical power and to output the light beam.

In other embodiments, laser source 66 may have electrical and/or optical ports (not shown) configured to directly connect with respective electrical and optical ports and/or connectors of panel 35. In such embodiments, at least one of electrical connector 77 and optical connector 88 may be removed from the configuration of LM 55. Note that in this configuration, the electrical and/or optical ports of LM 55 may replace electrical connector 77 and/or optical connector 88, respectively.

In yet other embodiments, LM 55 may have any other suitable shape and electrical connector 77 and/or optical connector 88 may be positioned at any other suitable positions on the substrate of LM 55. For example, substrate 42 may have a pentagonal structure or a hexagonal structure, wherein two or more of the facets or edges of substrate 42 are inserted into panel 35. In this configuration, electrical connector 77 and optical connector 88 may be mounted on different edges of substrate 42, so as to connect with corresponding mating connectors of panel 35.

In yet another embodiment, connectors 77 and 88 are mounted on different edges of LM 55 and substrate 42 is protruding into the chassis of switch 33 as described herein. For example, connectors 77 and 88 may be mounted on opposing edges 47 and 48 of LM 55, which when connected to sites in a slot or cage protruding into the chassis of switch 33, both connectors 77 and 88 are disconnected in the event where LM 55 is extracted from the aforementioned slot.

In other embodiments, connectors 77 and 88 may be mounted on different edges of LM 55 using other suitable configurations, such as but not limited to: (a) one or more optical connector 88 may be mounted on edge 48 and/or on edge 47, and one or more electrical connectors 77 may be mounted on rear edge 46, wherein both connectors 77 and 88 are protruding into the chassis of switch 33, or (b) one or more electrical connectors 77 may be mounted on edge 48 and/or on edge 47, and one or more optical connector 88 may be mounted on rear edge 46. In configuration (b), when substrate 42 is inserted into the chassis of switch 33, both connectors 77 and 88 may be mounted on substrate 42 at positions protruding into the chassis of switch 33.

Alternatively, one or more electrical connectors 77 may be mounted, on edges 47 and/or 48, such that when substrate 42 is inserted into the chassis of switch 33, the one or more electrical connectors may remain out of the chassis of switch 33 and be connected to switch 33 using any suitable interconnect, such as an electrical wire or lead, or an electrical trace. Note that at all the configurations having both connectors 77 and 88 mounted on different edges of LM 55, the optical path remains within the chassis of switch 33 and within the casing of LM 55. In these configurations, the light beam produced by laser source 66 cannot be emitted out of the chassis of switch 33 because, when LM 55 is powered, all elements of the optical path (e.g., optical fibers 44 and optical connector 88), are positioned within the casings of LM 55 and switch 33.

In some embodiments, connectors 77 and 88 are mounted on substrate 42 in any suitable configuration, for example, on the same edge (e.g., rear edge 46, or edge 47 or 48), or on different edges as described above, such that, when substrate 42 of LM 55 is plugged into panel 35, both connectors 77 and 88 are configured to be positioned within the chassis of switch 33. In other words, when LM 55 is plugged into panel 35, connectors 77 and 88 are not exposed out of the chassis of switch 33.

In alternative embodiments, any suitable type of board and/or electronic box may be used instead of substrate 32.

Note that using LM 55 in switching application is just an example. In other embodiments, LM 55 and one or more OTRs 36 may be used, mutatis mutandis, in server 12 together with an ASIC or a processor thereof (not shown) instead of with IC 34, or in any other optoelectronic system or module receiving a light beam input from LM 55.

Producing a Laser Module that is Pluggable into a Panel of a Network Switch

FIG. 3 is a flow chart that schematically illustrates a method for producing laser module 55 that is pluggable into panel 35 of switch 33, in accordance with an embodiment of the present invention.

The method begins at a laser source mounting step 100, with receiving substrate 42 having front edge 45 and rear edge 46, and mounting laser source 66 on substrate 42. In some embodiments, laser source 66 comprises (i) at least one electrical port, which is configured to receive electrical power, and (ii) at least one optical port, which is configured to output one or more light beams from laser source 66.

At a connectors mounting step 102, electrical connector 77 and optical connector 88 are mounted on the same edge, e.g., rear edge 46, of LM 55. At an electrical trace assembling step 104, one or more electrical traces 22 are assembled between the electrical port of laser source 66 and electrical connector 77 of LM 55. At an optical guide assembling step 106, one or more optical guides, such as optical fibers 44, are assembled between the optical port of laser source 66 and optical connector 88 of LM 55.

At a packaging step 108 that concludes the method, substrate 42 having (a) laser source 66, (b) connectors 77 and 88, (c) electrical traces 22, and (d) optical fibers 44, is packaged in a pluggable housing (not shown) of LM 55.

In other embodiments, the order of steps 102-108 may differ from the order described above. For example, at least one of assembling steps 104 and 106 may be carried out before mounting the connectors described in step 102. Additionally or alternatively, one or more of electrical traces 22 and/or optical fibers 44 may be formed during the fabrication of substrate 42. In such case, step 104 and/or step 106 may be redundant.

In other embodiments described in FIG. 2 above, laser source 66 may be connected directly to at least one of electrical connector 77 and optical connector 88. In such embodiments, the respective steps of the method, e.g., at least one of assembling steps 104 and 106, may be eliminated from the method. Similarly, step 102 may be eliminated from the method, in case the electrical and/or optical ports of laser source 66 are positioned on rear edge 46 and are configured to directly connect with the respective electrical and optical ports of panel 35.

Although the embodiments described herein mainly address network switches of optical communication systems, the methods and systems described herein can also be used in other applications, such as in any sort of system using a pluggable light source and particularly a pluggable laser source, in arrays or grids of microprocessors such as central processing units (CPUs) or graphical processing units (GPUs), and in network adapters also known as network interface cards.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
    an optical connector, which is configured to receive from a pluggable laser module a light beam produced by a single laser source in the pluggable laser module; and
    multiple optical transceivers (OTRs), which are configured to (i) receive multiple electrical signals and multiple portions of the light beam produced by the single laser source in the laser module, (ii) produce multiple optical communication signals by modulating the multiple portions of the light beam produced by the single laser source in the laser module with the multiple received electrical signals, respectively, and (iii) output the multiple optical communication signals to one or more optical fibers.

2. The system according to claim 1, and comprising an electrical connector, which is configured to: (i) supply electrical power to the pluggable laser module for producing the light beam when the pluggable laser module is plugged to the system, and (ii) disconnect the pluggable laser module from the electrical power when the pluggable laser module is detached from the system, so that the pluggable laser module cannot produce the light beam.

3. The system according to claim 2, wherein the optical connector and the electrical connector are mounted on a same panel of the system.

4. The system according to claim 3, wherein the optical connector and the electrical connector are mounted side-by-side along the same panel.

5. A method, comprising:
    receiving, from a pluggable laser module via an optical connector, a light beam produced by a single laser source in the pluggable laser module;
    receiving multiple electrical signals and multiple portions of the light beam produced by the single laser source in the laser module;
    producing multiple optical communication signals by modulating the multiple portions of the light beam produced by the single laser source in the laser module with the multiple received electrical signals, respectively; and
    outputting the multiple optical communication signals to one or more optical fibers.

6. The method according to claim 5, and comprising (i) supplying, via an electrical connector, electrical power to the pluggable laser module for producing the light beam when the laser module is plugged to a system, and (ii) disconnecting the pluggable laser module from the electrical power when the pluggable laser module is detached from the system, so that the pluggable laser module cannot produce the light beam.

7. The method according to claim 6, wherein the optical connector and the electrical connector are mounted on a same panel of the system.

8. The method according to claim 7, wherein the optical connector and the electrical connector are mounted side-by-side along the same panel.

\* \* \* \* \*